United States Patent [19]
McMills

[11] Patent Number: 4,570,055
[45] Date of Patent: Feb. 11, 1985

[54] ELECTRICALLY HEAT-RECOVERABLE ASSEMBLY

[75] Inventor: Corey J. McMills, Los Altos, Calif.

[73] Assignee: Raychem Corporation, Menlo Park, Calif.

[21] Appl. No.: 607,991

[22] Filed: May 7, 1984

[51] Int. Cl.⁴ .............................................. H05B 3/08
[52] U.S. Cl. ............................ 219/541; 174/DIG. 8; 174/735 C; 156/86; 156/380.2; 219/535; 219/549; 219/553; 264/105; 264/230; 338/22 SD; 252/510
[58] Field of Search ............... 219/300, 528, 535, 541, 219/543, 549, 553; 264/27, 105, 25, 230, 242; 174/72 R, 735 C, 92, DIG. 8; 156/86, 380.2; 338/22 R, 22 SC; 252/502, 510, 511

[56] References Cited

U.S. PATENT DOCUMENTS

| | | | |
|---|---|---|---|
| 3,766,357 | 10/1973 | Koester, Jr. | 219/535 X |
| 3,781,526 | 12/1973 | Damron | 219/553 X |
| 3,950,604 | 4/1976 | Ponneck | 174/DIG. 8 |
| 4,085,286 | 4/1978 | Horsma et al. | 174/92 |
| 4,366,201 | 12/1982 | Changani | 264/230 X |
| 4,421,582 | 12/1983 | Horsma et al. | 156/86 |

FOREIGN PATENT DOCUMENTS 1265194  3/1972  United Kingdom .

Primary Examiner—Volodymyr Y. Mayewsky
Attorney, Agent, or Firm—Stephen C. Kaufman; Timothy Richardson

[57] ABSTRACT

An electrically heat-recoverable assembly comprising a heat-recoverable article and a pair of electrodes. The electrodes supply current to the article without interfering or limiting the way in which the article can be deformed in order to render it heat recoverable. The electrodes are placed and connected to the article in light of the properties of the article, especially its volume resistivity. The assembly significantly reduces the possibilities of arching or sparking while generating sufficient heat that is generated sufficiently uniformly throughout the article.

19 Claims, 3 Drawing Figures

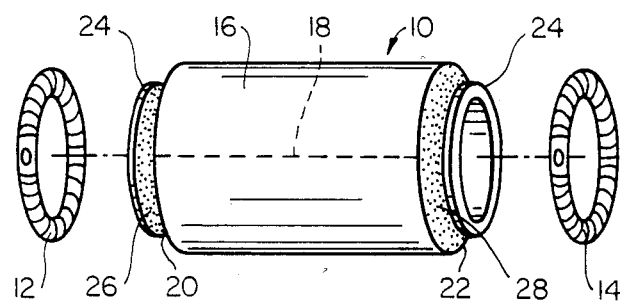
FIG_1
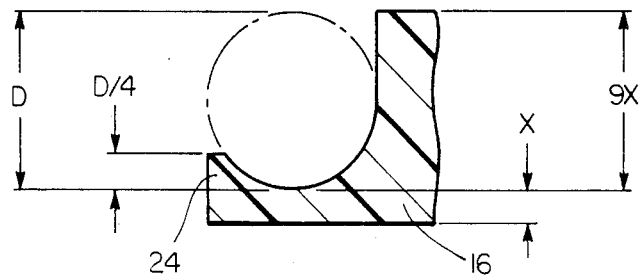
FIG_2
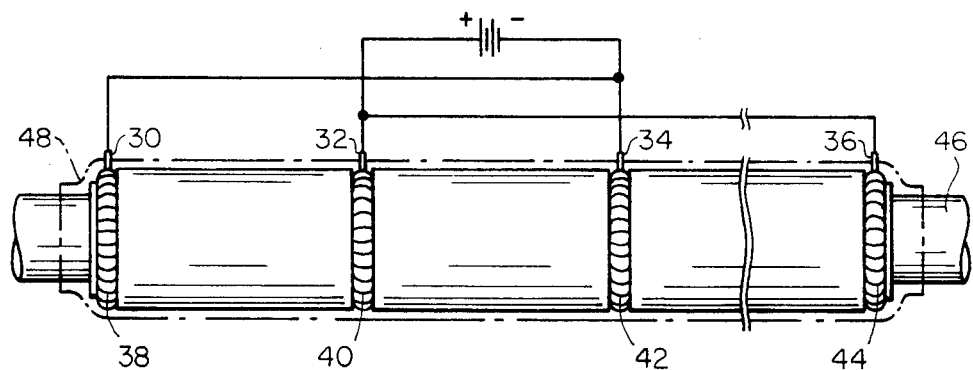
FIG_3

ELECTRICALLY HEAT-RECOVERABLE ASSEMBLY

CROSS-REFERENCE TO RELATED APPLICATION

This application is related to application Ser. No. 596,761 filed by Nachum Rosenzweig on Apr. 4, 1984 (MP0922-US1), the entire disclosure of which is incorporated by reference herein.

BACKGROUND OF THE INVENTION

1. Field of the Invention

This invention relates to an assembly and method for passing an electric current through a heat-recoverable article.

2. Introduction to the Invention

Heat recoverable articles, in particular, those that comprise one or more members of a conductive polymer i.e. an organic polymer having sufficient finely divided electrically conductive material disposed therein to render it electrically conductive, are well known. They may be used to provide sealing, insulating or protective coatings on substrates, for example, electrical joints and terminations. Reference may be made, for example, to U.S. Pat. Nos. 2,027,962, 3,086,142, and 3,770,556, the disclosures of which are hereby incorporated by reference.

Heat recoverable articles are typically recovered towards an original configuration by means of a torch or hot air gun, but this has serious disadvantages in many situations. It has, therefore, been proposed (see British Pat. No. 1,265,194 and U.S. Pat. No. 4,421,582) to make heat recoverable articles out of conductive polymers and to cause recovery of the article by passing an electric current through the conductive polymer, thus raising the temperature of the article to the recovery temperature, the current being supplied to the ends or intermediate points of the article by any suitable method, using for example alligator clips or other conventional clamps or electrodes.

SUMMARY OF THE INVENTION

In accordance with the present invention, I have now discovered that such heat recoverable articles give consistently satisfactory recovered products if sufficient account is taken in the design of an electrical heat-recoverable assembly. In particular, on the one hand, an electrode portion of the assembly should supply current to the article but without interferring with recovery or limiting the way which the article can be deformed in order to render it heat recoverable. On the other hand, the placement and the connection of the electrode portion to the article should be considered in light of the properties of the article, especially its volume resistivity. An assembly that may be structured and connected in accordance with these design principles helps to ensure that an assembly/electrical circuit does not open during heating, thus causing arching or sparking, and, that sufficient heat is generated sufficiently uniformly throughout the article.

In one aspect, the invention comprises a heat-recoverable assembly comprising (a) a heat recoverable article, and
(b) at least two electrodes,
the at least two electrodes capable of passing current substantially along a selected dimension of the article other than its thickness when placed in axially spaced apart electrical contact therewith, thereby generating sufficient heat to cause the article to recover towards an original configuration, the at least two electrodes changing their size and shape as the article recovers to maintain electrical integrity at the interface between the electrodes and the article.

A particularly important advantage of this aspect of the invention is the following. The electrodes are capable of passing current substantially along a selected dimension of the article other than its thickness, say its axial dimension. Preferably, in this case, the electrodes are placed axially spaced apart at least the distance of the thickness of the article, but may be placed at any substantially greater spaced apart distance (depending, at the same time, on the voltage of a power source connected to the electrodes and the particular volume resistivity of the article). For example, for an article having a tubular configuration with dimensions 0.20" thickness, 2.00" axial, 4.75" circumference and a volume resistivity of 3.8 ohm.cm, and with the electrodes connected to a 24 V power supply, two electrodes may be spaced at least 1.0 inches apart and up to 8.0 inches apart, the assembly providing a satisfactorily recovered product.

In its second aspect, this invention provides a method of repairing, reinforcing, joining or otherwise modifying a substrate, in which method an assembly as just defined above is placed adjacent the substrate(s), a pair of electrodes is placed in electrical contact with the heat-recoverable article, and the pair of electrodes is connected to a power-supply, thereby causing current to pass through the article.

In its third aspect, the invention provides a process for making an assembly, comprising (a) providing a heat recoverable article;
(b) cutting a pair of spaced apart, circumferential grooves in said article; and
(c) placing an electrode in each of said grooves.

BRIEF DESCRIPTION OF THE DRAWING

The invention is illustrated in the accompanying drawings. In particular:

FIG. 1 shows an exploded perspective view of the assembly of the present invention;

FIG. 2 shows an enlarged sectional view of the groove portion of the assembly; and FIG. 3 shows a side view of the assembly placed adjacent a substrate in accordance with the method of the present invention.

DETAILED DESCRIPTION OF THE INVENTION

As indicated above, the assembly of the present invention comprises a heat recoverable article and at least two electrodes, the at least two electrodes capable of passing current substantially along a selected dimension of the article other than its thickness when placed in axially spaced apart electrical contact with the article. Preferably, therefore, the article has a relatively low volume resistivity. The conductive polymers used in the present invention preferably have resistivities at 23° C. in the range of 1.5 to 100 ohm cm, with particularly preferred values within this range being dependent on the dimensions of the article, the electrode structure and placement (to be discussed below), and the power source. Preferably these factors are selected so that a satisfactory result (e.g. recovery of the article) is obtained in a relatively short time e.g. within 10 minutes, preferably within 5 minutes. Suitable power sources include for example DC voltages of 6, 12, 24, 38 or 48 volts, for which resistivities of 1 to 10 ohm cm are usually preferred, as well as voltages of 36–40, 110–120 or 220–240 volts AC, for which higher resitivities, e.g. 50–100 ohm cm, are appropriate. The preferred dimensions of the article depends on its intended use. Preferably, for a tubular article, the ratio of the diameter of the article to the wall thickness is less than 18:1, e.g. 2:1 to 12:1, after recovery. A relatively large wall thickness (prior to recovery) of at least 0.07 inch, preferably at least 0.1 inch, is often desirable in order to ensure adequate strength to resist mechanical stresses and internal pressures. Other shapes and configurations besides a tubular article may be advantageously employed in the present invention, including half-shells and ellipsoidal and cylindrical shapes that enclose a volume.

It will be appreciated that many possible conductive polymer compositions having the required low volume resistivity will be suitable for employment in the present invention. A particularly useful composition for this purpose is disclosed in the aforementioned Rosenzweig application and preferably consists essentially of,
 (a) a matrix consisting essentially of organic polymer particles which have been sintered together so that the particles have coalesced without completely losing their identity, and
 (b) a particulate filler, preferably carbon black, which is dispersed in the matrix but which is present substantially only at or near the boundaries of the coalesced particles.

As indicated above, the at least two electrodes change their size and shape as the article recovers to maintain electrical integrity at the interface between the electrodes and the article. Preferably the electrodes are integral with the article. If the article has a tubular shape, it recovers by generally expanding along the axial dimension of the article and radially contracting; the electrodes change their shape and size in correspondence with these changes in the article. For the tubular article, the electrodes are so placed on the article that current preferably flows substantially along the axial dimension, although the electrodes may be positioned so that current flows along the circumferential direction.

Attention is now directed to FIG. 1 which shows an assembly 10 of the present invention. The assembly 10 includes a pair of spring electrodes (12 and 14) which are positioned at end portions of a heat-recoverable article 16. The article 16 may have a tubular shape, as shown, or, be split along the line 18 so that it has the shape of a half-shell.

The article 16 may be prepared in the following manner.

UHMWPE powder (Hostalen GUR-413, available from American Hoechst), 95 parts by volume, having a molecular weight of about 4.0 million and an average particle size of about 0.1 mm, and carbon black (Ketjen Black EC, available from Akzo Chemie), 5 parts by volume, are thoroughly mixed together in a high speed blender. The mixture is used to fill a cylindrical mold having an annular cross-section (inner diameter 0.8 inch, outer diameter 1.2 inch). The mixture is compacted in the mold at room temperature for about 5 minutes, using a pressure of about 15,000 psi, and is then sintered in the mold at about 230° C. for about 60 minutes, using a very low pressure (2 psi or less). When sintering is complete, the sintered mixture is cooled in the mold to about 50° C., while maintaining it under a pressure of about 12,000 psi. The mold is then opened and the sintered product removed. The product is about 2 inch long. The sintered product is cross-linked by irradiating it to a dosage of about 3 Mrad, and is then rendered heat-shrinkable by expanding it at 120° C. to an inner diameter of about 1.2 inch, using a conical mandrel. The resistance of the product between the electrodes is about 5 ohms, the conductive polymer having a resistivity of about 3.8 ohm. cm.

FIG. 1 shows that circumferential grooves are cut into end portions of the article 16 at locations 20 and 22. The grooves preferably cut into at least approximately 60 percent of the wall thickness of the article. The grooves may, for example, be located on the exterior or interior of the article 16 and may, for example, be V shaped, have a flat bottom or be radiused. The grooves receive the spring electrodes 12 and 14 which, for example, may be extension, compression or helical springs which have, for example, a round, oval or flat configuration. The electrodes preferably have a resistance of not more than 25% of the resistance of the article 16 between any two electrodes. The electrical contact interface defined by the groove and electrode should provide a tight fit between them and this may be maximized by providing them with the same dimensions or providing an interference fit. To the same effect, the electrodes may be secured to the article by providing the grooves with an extended lip portion 24. The lip portion 24 preferably extends a distance (see FIG. 2) that is at least 25% of the diameter D of an electrode. Silver paint electrodes 26 and 28 may be painted onto a groove and lip portion 24, as shown in FIG. 1, to optimize axial current flow through the article 16.

FIG. 3 is similar to FIG. 1 and includes a DC power supply connected by way of electrical leads to quick-disconnect contacts 30, 32, 34 and 36, in turn connected to a plurality of spring electrodes 38, 40, 42 and 44 respectively. Also shown in FIG. 3 is a substrate 46 that may be repaired or reinforced etc according to the method of the present invention. Further shown in FIG. 3 is a heat-recoverable insulation member 48 that may be positioned around the assembly 10 in order to provide additional mechanical protection and to further reduce the possibilities of sparking or arching.

I claim:
1. An assembly comprising
 (a) a heat recoverable article having a tubular shape and having at least two grooves, each one of said grooves to receive an electrode; and
 (b) at least two electrodes, the at least two electrodes capable of passing current substantially along a selected dimension of the article other than thickness when placed in axially spaced apart electrical contact therewith, thereby generating sufficient heat to cause the article to recover towards an original configuration, the at least two electrodes changing their size and shape as the article recovers to maintain electrical integrity at the interface between the electrodes and the article.

2. An assembly according to claim 1, wherein the electrodes are integral with the article.

3. An assembly according to claim 1, comprising a pair of electrodes separated by at least 0.50 inches.

4. An assembly according to claim 1, further comprising silver paint electrodes painted onto the at least two grooves.

5. An assembly according to claim 1, wherein each of said grooves have an extended lip portion to secure an electrode to said article.

6. An assembly according to claim 1, wherein the at least two electrodes are springs.

7. An assembly according to claim 1, wherein the at least two electrodes are springs, and the springs mate to said article as it recovers by radially contracting.

8. An assembly according to claim 1, wherein the article has a wall thickness, prior to recovery, of at least 0.07 inch.

9. An assembly according to claim 1, wherein the groove cuts into at least 60 percent of the wall thickness.

10. An assembly according to claim 1, the article comprising an organic polymer and, dispersed in the polymer, a particulate conductive filler.

11. An assembly according to claim 1 wherein the article comprises (a) a matrix consisting essentially of organic polymer particles which have been sintered together so that the particles have coalesced without completely losing their identity, and (b) a particulate conductive filler which is dispersed in said matrix but is present substantially only at or near the boundaries of the coalesced particles.

12. An assembly according to claim 11 wherein the article composition has a resistivity at 23° C. of 1 to 100 ohm.cm and contains less than 9% by volume of a particulate conductive filler.

13. An assembly according to claim 12 wherein the conductive filler is carbon black.

14. An assembly according to claim 1 wherein the article
 (a) has a resistivity at 23° C. of 1 to 100 ohm.cm, and
 (b) comprises
  (i) a matrix consisting essentially of particles of ultra high molecular weight polyethylene which have been sintered together so that the particles have coalesced without losing their identity, and
  (ii) less than 9% by volume of a particulate conductive filler which is dispersed in said matrix but is present substantially only at or near the boundaries of the coalesced particles of polyethylene.

15. An assembly according to claim 14 wherein the polyethylene has a molecular weight greater than 4.0 million.

16. An assembly according to claim 15 wherein the conductive polymer composition contains 2 to 6% by volume of carbon black.

17. An assembly according to claim 1, comprising an article which is composed of a conductive polymer composition comprising
 (a) a matrix consisting essentially of organic polymer particles which have been sintered together so that the particles have coalesced without losing their identity, and
 (b) a particulate conductive filler which is dispersed in said matrix but is present substantially only at or near the boundaries of the coalesced particles.

18. An assembly according to claim 17 wherein the matrix consists essentially of ultra high molecular weight polyethylene.

19. An assembly according to claim 18 wherein the conductive polymer composition contains 2 to 6% by volume of carbon black and has a resistivity at 23° C. of 2.5 to 25 ohm.cm.

* * * * *

UNITED STATES PATENT AND TRADEMARK OFFICE
CERTIFICATE OF CORRECTION

PATENT NO. : 4,570,055.
DATED : February 11, 1986
INVENTOR(S) : Corey J. McMills It is certified that error appears in the above-identified patent and that said Letters Patent are hereby corrected as shown below:

After "Date of Patent" delete "February 11, 1985" and
insert -- February 11, 1986 --.

Signed and Sealed this

Twenty-ninth Day of July 1986

[SEAL]

Attest:

DONALD J. QUIGG

Attesting Officer

Commissioner of Patents and Trademarks